(No Model.)
T. J. SUTTON.
FISHING REEL.
No. 554,011.　　　　　Patented Feb. 4, 1896.
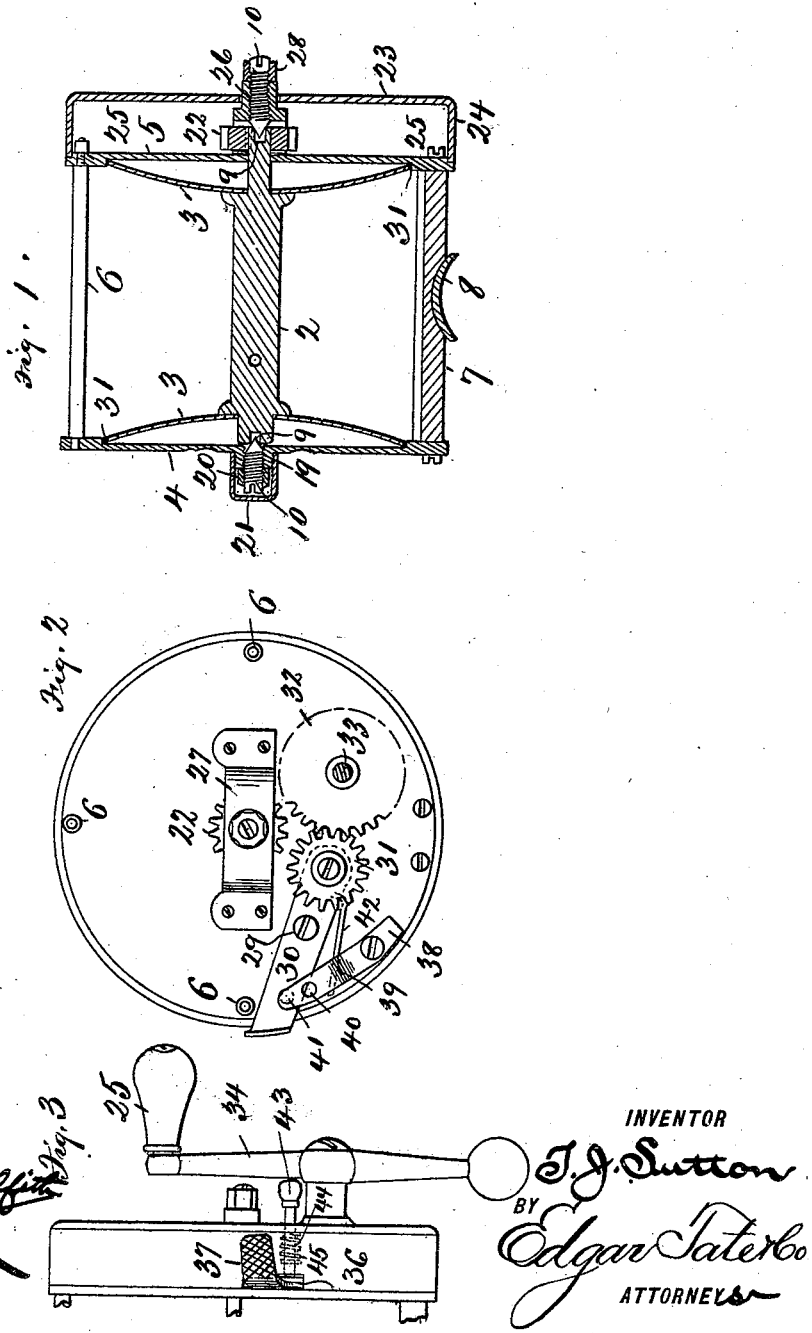
WITNESSES:
INVENTOR
T. J. Sutton
BY Edgar Tate & Co
ATTORNEYS

UNITED STATES PATENT OFFICE.

THOMAS J. SUTTON, OF NEW YORK, N. Y.

FISHING-REEL.

SPECIFICATION forming part of Letters Patent No. 554,011, dated February 4, 1896.

Application filed March 19, 1895. Serial No. 542,316. (No model.)

*To all whom it may concern:*

Be it known that I, THOMAS J. SUTTON, a citizen of the United States, and a resident of New York, county of New York, and State of New York, have invented certain new and useful Improvements in Fishing-Reels, of which the following is a specification, reference being had to the accompanying drawings, forming a part thereof, in which similar figures of reference indicate corresponding parts in all the figures.

This invention relates to reels for fishing-rods, and the object thereof is to provide a simple and effective pivotal support for the reel, and also means for connecting the crank or winding devices therewith and throwing the same out of gear with the reel when desired.

The invention is fully disclosed in the following specification, of which the accompanying drawings form a part, in which—

Figure 1 is a central longitudinal section through the center of the reel and its support; Fig. 2, a plan view of the gearing mechanism connecting the handle or winder with the shaft of the reel and means for throwing the same into or out of gear therewith, and Fig. 3 a side view of the end casing inclosing the parts shown in Fig. 2 and showing the crank and other elements.

Referring to the drawings, the numeral 2 designates the shaft of the reel, which is provided with the inwardly-convexed heads or end pieces 3 rigidly secured thereto, said reel being supported in a frame consisting of the end plates 4 and 5 and the connecting rods or bars 6, and a plate or bar 7 provided with a transverse-curved plate 8, by means of which the device is secured to the rod or pole. Each end of the shaft 2 is provided with a circular recess or cavity 9, designed to receive the pointed end of a pivot or support 10, which is screw-threaded, as shown, and secured in the following manner:

The end plate 4 is provided centrally with an outwardly-extending tubular shoulder or projection 19, screw-threaded on both its outer and inner surfaces, and through this projection is passed the screw-threaded pivotal support 10, on which is placed a set-screw nut 20, and over all is placed a screw-threaded cap 21.

At the opposite end the shaft 2 is decreased in size and extends a short distance through the end plate 5, and has mounted thereon a pinion 22. In this case the pivot 10 is supported by an end casing 23, having an annular rim 24, the casing 23 being secured to the end plate, preferably by screws, and forming in connection with said end plate a chamber 25. Through the center of this casing is passed a tubular projection 26, formed on a bracket or loop 27, secured to the end plate and inclosing the end of the shaft 2, and pinion 22 mounted thereon, and through the screw-threaded tubular projection 26 is passed the pivot 10, on which is mounted a set-nut 28, and it is evident that by means of the pointed screw-threaded pivots 10, their screw-threaded supports and the set-nuts thereon a most nice and perfect adjustment of the pressure on the reel and a perfect pivotal support therefor is secured.

Pivotally supported at 29 within the chamber 25 is a lever 30, on one end of which is mounted a pinion 31, designed to engage with a wheel or pinion 32, the shaft 33 of which extends through the casing 25 and has secured thereto the crank 34, provided with the usual handle 25. The outer end of the lever 30 extends through a slot 36 in the rim 24, and is bent over flush with said rim, as shown at 37, the projection 37 thereof being serrated to form a support for the thumb, by which the lever is operated.

Within the chamber 25 and secured to the plate 5 is an arm or plate 38, which is provided with an outwardly-extending shoulder 39, and the free end of which extends over the lever 30, preferably in contact therewith, forming a guide therefor. The arm 38 is provided near its free end with a perforation 40, which meshes with a corresponding perforation 41 formed in the lever 30, under certain circumstances, as hereinafter described, and a spring 42, which passes under the arm 38 and connects with the lever 30, acts to hold the lever and pinion 31 in the position shown in Fig. 2, out of contact with the pinion 22.

Passing through the casing 23 is a movable headed pin 43, on which, inside of the casing, is mounted a spring 44, secured in place by a lug 45.

Referring again to Fig. 1, it will be seen that the outer edges of the heads 3, which are convex on their inner surfaces, fit and move within an annular recess 3' formed in said heads, by which construction there is no offset or shoulder formed at this point, and the inner surfaces of the end plates and heads 3 are practically smooth and continuous.

The operation is as follows: In the normal condition of the apparatus the headed pin 43 enters the perforation 40 in the arm 38 and also the projection 41 in the lever 30, which is drawn back so that said projections 40 and 41 mesh, and in this position the pinion 31 on the lever 30 contacts with the pinion 22 on the end of the reel-shaft, the pinion 31 being also in contact with the pinion 32 connected with the crank-shaft, and it will thus be seen that the crank and reel are in connection, and the reel may be operated as usual by the crank. Whenever it is desired, however, to disconnect the crank and reel, it is only necessary to pull outwardly on the headed pin 43, which will be withdrawn from the perforations 40 and 41 in the arm 38 and lever 30. The spring 42 will then act to draw the inner end of the lever 30 and pinion 31 mounted thereon into the positions shown in Fig. 2 and out of contact with the pinion 22 on the shaft of the reel. As will be readily seen, in this position of these parts there will be no connection between the crank and the reel-shaft and the reel will be free to revolve independently thereof. Whenever it becomes desirable to again connect these parts so as to operate the reel by means of the crank, it is only necessary to pull backward on the thumb-piece 37 connected with the reel 30 until said lever strikes against the end of the slot 36, (shown in Fig. 3,) when the pin 43 will again pass through the perforations 40 and 41, holding the lever 30 in the position necessary to connect the pinion 31 with the pinion 22, in which the crank will be in gear with said pinion 22 through pinion 31, and the reel may be operated by means of the crank in the usual manner. The spring 44 on the headed pin 43 operates to force said pin forwardly, and when said pin is withdrawn to admit of the return of the gear-wheels and lever 30 to the position shown in Fig. 2 it is operated against the force of said spring 44.

It will thus appear that I accomplish the object of my invention by means of a device simple in construction and operation and one which is perfectly adapted to serve the purpose for which it is intended, and which does not add materially to the cost of the apparatus.

I do not confine myself to the exact form, construction, and combination of parts shown, as it is evident that various modifications therein may be formed without departing from the scope of my invention; but, Having fully described the invention, its construction and operation, what I claim, and desire to secure by Letters Patent, is—

1. In a reel or similar device, the combination, with a reel supported in a frame, through one end of which one end of the reel-shaft extends and has mounted thereon a pinion, of a casing connected with said end and forming a chamber inclosing said pinion, a crank the shaft of which passes through said casing and is provided in said chamber with a pinion mounted thereon, a lever pivotally supported in said casing, one end of which extends through the side thereof and the other end of which is provided with a pinion which gears with said pinion on the crank-shaft and is adapted to be placed in gear with said pinion on the reel-shaft, and a spring connected with said lever, the normal operation of which is to hold the pinion on the lever out of gear with the pinion on the reel-shaft, and means for connecting said pinions and holding them in gear, substantially as shown and described.

2. The combination, with a reel-support provided with end pieces, of a reel supported therein, one end of the shaft of which extends through one of said end pieces and is provided with a pinion mounted thereon, a casing secured to said end piece and forming a chamber, in which is located said pinion, a crank the shaft of which extends inwardly through said casing and is provided with a pinion mounted thereon, a lever also pivotally mounted in said casing, one end of which extends through the side thereof by which the same is supported, and the other end of which is provided with a pinion in gear with the pinion on the crank-shaft and adapted to be placed in gear with the pinion on the reel, a spring connected with said lever operating to hold the pinion thereon out of gear with the pinion on the reel, an arm or plate mounted in said casing and extending over said lever, and means for operating the latter to place the gear thereon in connection with the gear upon the reel-shaft and locking the parts in said position, substantially as shown and described.

3. The combination, with a reel-support provided with end pieces, of a reel supported therein, one end of the shaft of which extends through one of said end pieces and is provided with a pinion mounted thereon, a casing secured to said end piece and forming a chamber, in which is located said pinion, a crank the shaft of which extends inwardly through said casing and is provided with a pinion mounted thereon, a lever also pivotally mounted in said casing, one end of which extends through the side thereof by which the same is operated, and the other end of which is provided with a pinion in gear with the pinion on the crank-shaft and adapted to be placed in gear with the pinion on the reel, a spring connected with said lever operating to hold the pinion thereon out of gear with the pinion on the reel, an arm secured in said casing and extending over said lever, each of said parts being provided with a perforation adapted to mesh when the lever is operated to place the pinion thereon in gear with the pinion on the reel-shaft, and a spring bolt or pin extending through the casing and adapted to enter said perforations and lock the parts in gear with the reel-shaft, substantially as shown and described.

4. The combination, with a frame provided with end pieces, of a reel, one end of the shaft of which extends through one of said end pieces and is provided with a pinion mounted thereon, of a bracket or support secured to said end piece and inclosing said pinion and end of the shaft, and provided with a screw-threaded projection, through which extends a screw-threaded pivot, which operates in connection with the end of the reel-shaft, of a casing secured to said end piece and forming a chamber, a crank-shaft extending through said casing and having mounted thereon within said chamber a pinion, a lever also pivotally supported in said chamber, one end of which extends through the side thereof and the other end of which is provided with a pinion in gear with the pinion on the crank-shaft, and means for operating said parts so as to alternately place the pinion on the lever in and out of gear with the pinion on the reel-shaft, substantially as shown and described.

5. The combination, with a frame provided with end pieces and a reel supported therein, the shaft of said reel being provided at each end with a recess adapted to receive the pointed end of a pivotal support, of screw-threaded pointed pivotal supports, one of which passes at one end through a screw-threaded projection on the end piece and provided with a set-nut, the other end of the reel-shaft passing through the end piece or plate and provided with a pinion mounted thereon, and a bracket secured to said end piece and provided with a tubular screw-threaded projection adapted to receive the screw-threaded pivot for said end of the reel-shaft, a set-nut mounted on said pivot and operating in connection with said projection, and a casing inclosing said bracket and pinion, through the center of which the screw-threaded projection on the bracket passes, and a crank the shaft of which extends through said casing and is provided with a pinion mounted thereon in said chamber, and means for alternately placing said pinion in and out of gear with the pinion on the reel-shaft, substantially as shown and described.

In testimony that I claim the foregoing as my invention I have signed my name, in presence of two witnesses, this 15th day of March, 1895.

THOMAS J. SUTTON.

Witnesses:
PERCY T. GRIFFITH,
A. M. CUSACK.